Oct. 25, 1960     E. A. EVEREST ET AL     2,957,541
AUTOMOBILE MECHANIC'S APPLIANCE
Filed Dec. 19, 1957     2 Sheets-Sheet 1
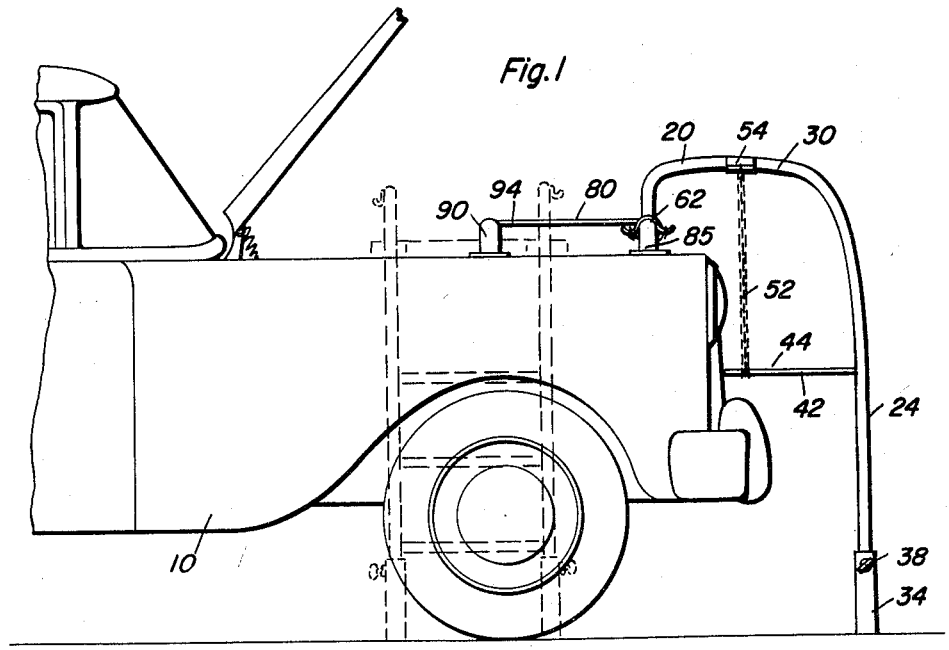
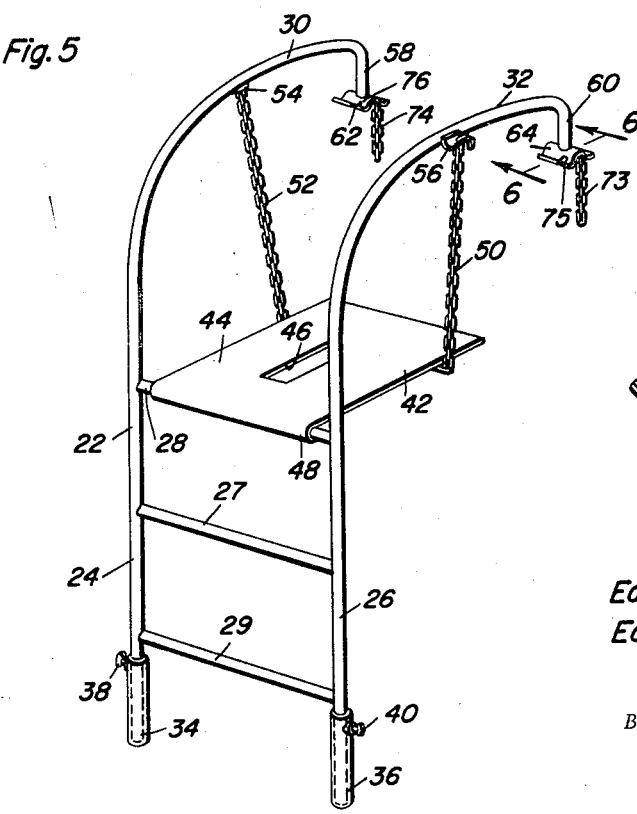
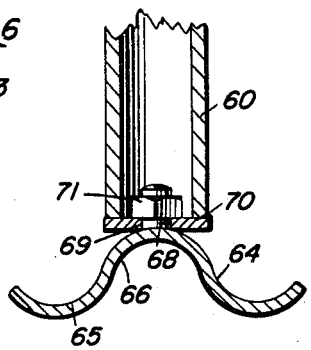
Edward A. Everest
Edwin A. Hudgpeth
INVENTORS Oct. 25, 1960 E. A. EVEREST ET AL 2,957,541
AUTOMOBILE MECHANIC'S APPLIANCE
Filed Dec. 19, 1957 2 Sheets-Sheet 2

Edward A. Everest
Edwin A. Hudgpeth
INVENTORS

800
United States Patent Office 2,957,541
Patented Oct. 25, 1960

2,957,541

AUTOMOBILE MECHANIC'S APPLIANCE

Edward A. Everest, 837 S. Ave. D., and Edwin A.
Hudgpeth, 202 N. Tornillo, both of Kermit, Tex.

Filed Dec. 19, 1957, Ser. No. 703,925

9 Claims. (Cl. 182—115)

This invention relates to an appliance to facilitate the work of automobile mechanics.

An object of the invention is to provide an appliance to facilitate working on automobiles and more particularly to facilitate the repair of parts in the engine compartment of motor vehicles. This is achieved by a stand and a rack with the rack adjustable to fit across the sides of the engine compartment and provide means on which to support an end of the stand. It is preferred that the stand have adjustable legs to suit the particular motor vehicle that is being repaired and the desires of the mechanic. The stand has steps and a knee shelf on which the mechanic may rest after walking up the steps. The rack fits across the engine compartment and provides a support for the upper end of the stand, but this support may be achieved either at the front or either side of the motor vehicle. The rack is so designed that it will accommodate the upper end of the stand in any of these positions.

All new and older motor vehicles have been constructed so that it is very difficult for the mechanic to reach the distributor, carburetor and many of the other engine components which require periodic service. Our invention enables them to service these parts of the motor vehicle as well as the engine itself with a minimum of difficulty and by this we mean without having to strain in leaning over the radiator, fenders, etc.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side view of a typical motor vehicle with my appliance shown in one position in full line and shown in a second position in dotted lines;

Figure 5 is a perspective view of the stand that constitutes a part of my invention.

Figure 6 is an enlarged sectional view of the stand clamp and taken on the line 6—6 of Figure 5.

Figure 2:
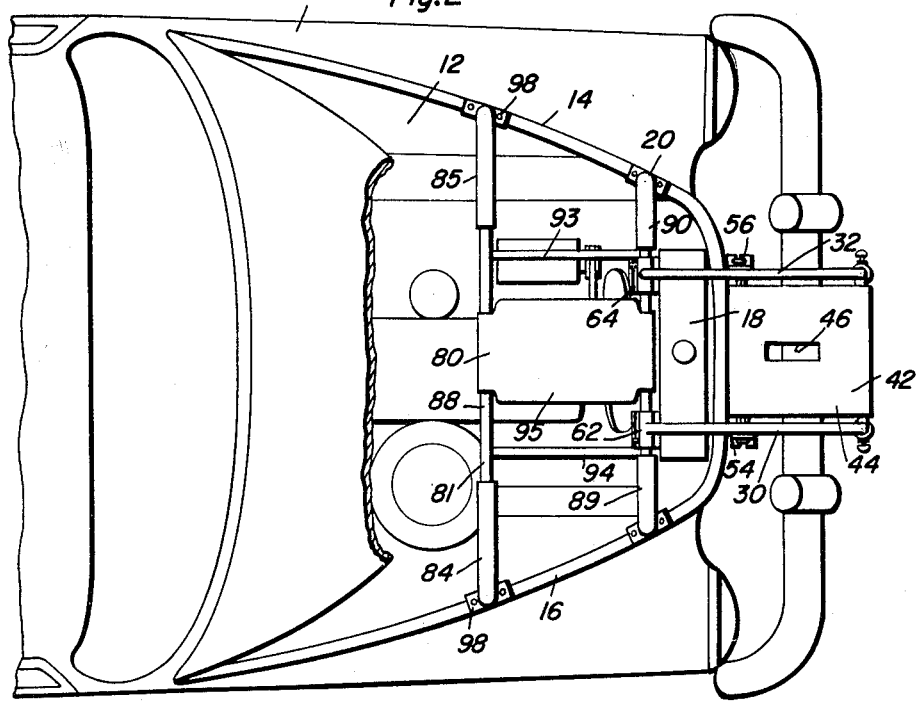
Figure 2 is a top view of the motor vehicle fragment in Figure 1.
Figure 3:
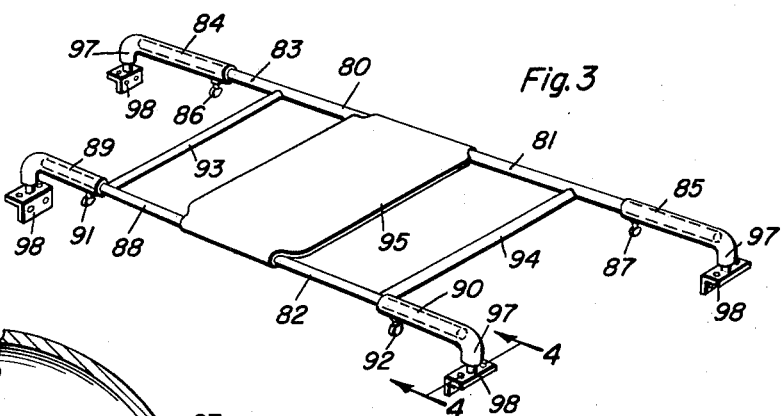
Figure 3 is a perspective view of the rack which constitutes a part of the invention.

In the accompanying drawings there is a motor vehicle 10 which schematically represents any manufacturer's make of automobile, truck, bus, etc. Motor vehicles have an engine compartment 12 with sides 14 and 16 terminating at the front near radiator 18. It is particularly difficult to make repairs on the engine of the motor vehicle in compartment 12 and any and all accessories are not very close to the sides 14 and 16. Even some of these accessories are difficult to repair or adjust or service.

Our appliance 20 greatly facilitates the repair of these parts, the engine, etc. The appliance is constructed of a stand 22 made of rails 24 and 26 having ladder rungs 27, 28 and 29 extending thereacross and secured thereto. It is preferred that the rails be made of tubular material and they have inwardly extending upper end parts 30 and 32. The lower ends of the rails 24 and 26 have extensions 34 and 36 thereon. These may be in the form of tubes with setscrews 38 and 40 carried by them and engaging the surfaces of the rails 24 and 26 to hold the extensions in the selected position of adjustment. Accordingly, the effective height of the stand 22 can be adjusted by adjusting the extensions 34 and 36.

A knee rest 42 is pivotally attached to the rung 28. The knee rest is formed of a panel 44 that has an opening 46 in it through which the mechanic may pass his hand for repair of parts below the knee rest. The inner edge of the knee rest has a sleeve 48 formed thereon and this is mounted for pivotal movement on the rung 28. The downward extent of travel of the knee rest is governed by chains 50 and 52 whose lower ends are attached to the panel 44 and whose upper ends are attached in brackets 54 and 56 attached to the parts 30 and 32 of the rails. Each bracket is formed of a small plate that is welded or otherwise fixed in place. The plates have slots into which selected links of the chains 50 and 52 can be slid.

The inner extremities of parts 30 and 32 are downturned as at 58 and 60 and they have clamps 62 and 64 thereon. Each clamp is constructed of a plate, for example plate 65 (Figure 6) for clamp 64 that has a downwardly opening recess 66. Stud 68 is welded to the plate 65 and passes through an opening 69 in the end plate 70 on extremity 60 of rail 26. A nut 71 is on the stud 68 thereby enabling the clamp to be rotated about the stud as an axis of rotation but preventing the clamp from separating from the rail. Chains 73 and 74 are attached at one end to each clamp and are adapted to be fitted into slots 75 and 76 in the plates of the clamps whereby the clamps are capable of being firmly attached in place.

Figure 4:
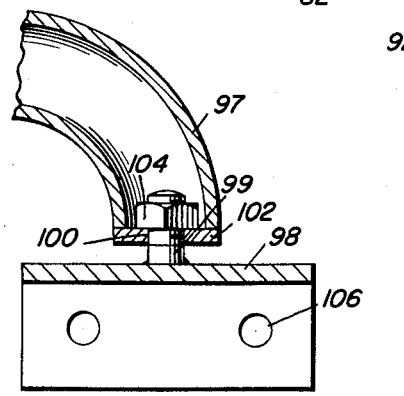
Figure 4 is an enlarged sectional view taken on the line 4—4 of Figure 3.

Rack 80 is another component of our appliance 20 and it is made of a pair of sides 81 and 82, each of which is extensible. Slide 81 is made of a central bar 83 having sleeves 84 and 85 slidable on the ends thereof. Setscrews 86 and 87 hold the sleeves 84 and 85 in the correct adjustment on bar 83. Side 82 is constructed of a center bar 88 together with sleeves 89 and 90 which constitute adjustable extensions thereon. These are held in place by setscrews 91 and 92 that are carried by the extensions and that bear against the surface of the intermediate bar 88. Transverse bars 93 and 94 are attached to the intermediate parts of the extensible sides 81 and 82, as is panel 95 which constitutes a small parts tray. The extensions of the intermediate parts of both sides have downturned ends 97 and each has a clamp 98 thereon. Typical clamp (Figure 4) is made of a piece of angle iron with the upper flange provided with a stud 99 that passes through a hole 100 in end plate 102 on angulated end 97. Nut 104 is on stud 99 and holds the angle iron piece firmly mounted but yet enables it to rotate to a full 360°. A plurality of holes 106 are in the flanges of the short pieces of angle iron in case the mechanic desires to attach them by bolts or other similar fasteners.

In use, the rack is placed across the sides 14 and 16 of the engine compartment of the motor vehicle. Clamps 98 rest on the sides 14 and 16 and it is to be pointed out at this time that these clamps may be padded should this be desired. In either case after the correct adjustment of the sides 81 and 82 of the rack is achieved, the setscrews are tightened thereby preventing the rack from moving after it has been set.

The correct length of stand 20 is achieved by adjusting the extensions 44 and 36. Then it is placed either at the front or at either side of the motor vehicle with the knee rest 42 being used should the mechanic desire to use it. When placed at the front of the motor vehicle as shown in Figure 2, the clamps 62 and 64 are engaged with the extensible side 82 of the rack. When the stand is placed on the sides of the motor vehicle, the bar 93 or the bar 94 is used. This provides a much better position for the mechanic to work on the exterior of the motor vehicle compartment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an appliance for a motor vehicle mechanic, a rack adapted to extend across the engine compartment of the motor vehicle, said rack having extensibly adjustable sides to fit in different positions and to fit different wall spacings of different vehicle engine compartments, a stand, and means on said stand for attaching the upper end of the stand in selected positions on said rack.

2. The combination of claim 1 wherein said stand has at least one ladder rung, and a knee rest operatively connected to said rung below said stand to facilitate the mechanic's work in repair of parts in and around the engine compartment of the motor vehicle.

3. The combination of claim 1 wherein said stand has at least one ladder rung, a knee rest operatively connected to said rung to facilitate the mechanic's work in repair of parts in and around the engine compartment of the motor vehicle, said knee rest including a panel pivoted to said rung, and means operatively connected with said panel to hold said panel in selected pivotal positions.

4. The combination of claim 1 wherein said stand has rails, rungs extending across and secured to said rails, and extensions adjustably carried by said rails to alter the effective height of said stand.

5. The combination of claim 1 wherein said stand has at least one ladder rung, a knee rest operatively connected to said rung to facilitate the mechanic's work in repair of parts in and around the engine compartment of the motor vehicle, said knee rest including a panel pivoted to said rung, and means operatively connected with said panel to hold said panel in selected pivotal positions, said panel having an access opening formed therethrough which access may be had to one side of the panel for the other side thereof.

6. A mechanic's appliance to facilitate the repair of motor vehicles that have engine compartments, a stand that has rails, at least one ladder rung extending across and secured to said rails, means on said rails for attaching the upper part of the rails to the motor vehicle, and a knee rest connected with said rung, said means mounting the upper end of the stand on the motor vehicle including a transverse extensibly adjustable rack adapted to extend across the engine compartment.

7. A mechanic's appliance to facilitate the repair of motor vehicles that have engine compartments, a stand that has rails, at least one ladder rung extending across and secured to said rails, means on said rails for attaching the upper part of the rails to the motor vehicle, a knee rest connected with said rung, said means mounting the upper end of the stand on the motor vehicle including a rack adapted to extend across the engine compartment, said rack having a plurality of sides and bars, and clamps on said rails selectively attached to said sides and said bars so that said stand may be positioned at a selected location with respect to the motor vehicle.

8. The appliance of claim 1 wherein said attaching means include clamps rotationally connected with said stand.

9. The appliance of claim 7 wherein there are means rotatively connecting said clamps to said rails.

References Cited in the file of this patent
UNITED STATES PATENTS

| | | |
|---|---|---|
| 434,462 | Raber | Aug. 19, 1890 |
| 818,268 | Leuz | Apr. 17, 1906 |
| 1,830,347 | Camden et al. | Nov. 3, 1931 |
| 2,378,678 | Anderson | June 19, 1945 |
| 2,481,595 | Hughes | Sept. 13, 1949 |
| 2,488,633 | Linder et al. | Nov. 22, 1949 |
| 2,599,192 | Miller | June 3, 1952 |
| 2,701,168 | Schemers | Feb. 1, 1955 |
| 2,760,707 | Anderson | Aug. 28, 1956 |
| 2,851,312 | Hoff | Sept. 9, 1958 |
| 2,852,785 | Mikola | Sept. 23, 1958 |